(12) United States Patent
Okamoto et al.

(10) Patent No.: US 10,103,674 B2
(45) Date of Patent: Oct. 16, 2018

(54) DRIVE CONTROL APPARATUS FOR MULTIPLE-WINDING MOTOR

(71) Applicant: TOSHIBA MITSUBISHI-ELECTRIC INDUSTRIAL SYSTEMS CORPORATION, Chuo-Ku (JP)

(72) Inventors: Yuriko Okamoto, Chiyoda-ku (JP); Akira Satake, Chiyoda-ku (JP); Hiromitsu Suzuki, Chuo-Ku (JP); Masahiko Tsukakoshi, Chuo-Ku (JP); Ritaka Nakamura, Chuo-Ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 36 days.

(21) Appl. No.: 15/518,286

(22) PCT Filed: Nov. 20, 2014

(86) PCT No.: PCT/JP2014/080727
§ 371 (c)(1),
(2) Date: Apr. 11, 2017

(87) PCT Pub. No.: WO2016/079839
PCT Pub. Date: May 26, 2016

(65) Prior Publication Data
US 2017/0310264 A1    Oct. 26, 2017

(51) Int. Cl.
*H02P 1/26* (2006.01)
*H02P 27/06* (2006.01)
(Continued)

(52) U.S. Cl.
CPC ........... *H02P 27/06* (2013.01); *B66B 1/30* (2013.01); *H02P 6/10* (2013.01); *H02P 9/48* (2013.01)

(58) Field of Classification Search
USPC ............... 318/722, 800, 122, 724, 733, 632
See application file for complete search history.

(56) References Cited

U.S. PATENT DOCUMENTS

| 8,035,254 B2* | 10/2011 | Djenguerian | ..... H02M 3/33523 |
| | | | 307/103 |
| 9,438,142 B2* | 9/2016 | Suzuki | .................. B60L 3/0046 |
| 2003/0085683 A1 | 5/2003 | Satake et al. | |

FOREIGN PATENT DOCUMENTS

| JP | 5-260792 A | 10/1993 |
| JP | 11-206167 A | 7/1999 |

(Continued)

OTHER PUBLICATIONS

International Search Report dated Feb. 10, 2015 in PCT/JP2014/080727 filed Nov. 20, 2014.

*Primary Examiner* — Bentsu Ro
*Assistant Examiner* — Iftekhar Mustafa
(74) *Attorney, Agent, or Firm* — Oblon, McClelland, Maier & Neustadt, L.L.P.

(57) ABSTRACT

In a drive control apparatus for a multiple-winding motor including a power converter for driving a winding group per each winding group of a multiple-winding motor having a plurality sets of winding groups, a compensation amount calculator obtains, by using a signal of a first controller controlling a first power converter driving a first winding group among the winding groups, a compensation amount for compensating a signal of an other controller controlling an other power converter other than the first power converter, based on the compensation amount obtained by the compensation amount calculator. A signal of the other controller is compensated to control the other power converter, and the first power converter is controlled without compensating a signal of a first controller.

10 Claims, 17 Drawing Sheets

(51) Int. Cl.
*H02P 9/48* (2006.01)
*H02P 6/10* (2006.01)
*B66B 1/30* (2006.01)

(56) References Cited

FOREIGN PATENT DOCUMENTS

JP 2003-153585 A 5/2003
JP 2004-32849 A 1/2004

\* cited by examiner

| $R_1 = R_2$ | 1.254Ω |
| --- | --- |
| $L_s\ (=L_{1d}=L_{1q}=L_{2d}=L_{2q})$ | 13.2mH |
| $R_{bank}$ | -0.210Ω |
| $M_{bank}$ | 4.40mH |

DRIVE CONTROL APPARATUS FOR MULTIPLE-WINDING MOTOR

TECHNICAL FIELD

This invention relates to a control device which performs driving control of a multiple-winding motor comprising a plurality sets of winding groups which are independent in a motor by using a plurality of power converters.

BACKGROUND ART

A multiple-winding motor is a motor comprising a plurality sets of winding groups which are independent in a motor and is widely used because a multiple-winding motor has merits such that winding is multiplexed so as to be able to make a greater capacity and greater torque, and for each of multiple winding groups, control can be performed and harmonic of a motor can be reduced. As a drive device for a multiple-winding motor, a control device having the configuration such that drive is performed by using a plurality of power controllers is well known. There is a merit such that by using a plurality of power converters, without changing a main circuit of a converter, motors having a different capacity can be driven. As a problem concerning control of a multiple-winding motor, it is known such that in a plurality of winding groups, magnetic coupling is generated between winding groups, and an influence is given to winding groups each other. There is a problem such that control performance is deteriorated by inter group interference which is caused by magnetic coupling so as to cause decrease of control response and current ripple.

As means to solve the above-mentioned problem, there is a control method to separate a mean current and a differential current in two winding groups in a main circuit having the configuration such that two voltage-source-type inverter apparatuses which are connected in parallel to two multiple-winding motors. Current control is performed so as for a mean component which contributes to an output of a motor to follow a command value. On the other hand, control is performed so as for a differential current between winding groups to be zero in order to suppress imbalance between a plurality groups of winding groups. By performing the above-mentioned, imbalance between two winding groups is eliminated, and low-torque ripple and high response is realized. (for example, Patent Document 1)

Further, regarding a control device in which each current control device is provided for each winding group in a multiple-winding motor, a method in which q-axis current is controlled so as to uniformly control magnetic flux in each winding group is well-known. Same torque is given to each group, and a phase for magnetic pole adjustment which was adjusted in advance is given to a coordinate converting part of a current control device so as to compensate a magnetic pole position. By doing the above-mentioned, efficiency reduction which is caused by current imbalance between winding groups can be improved and vibration can be suppressed. (for example, Patent Document 2)

Further, Patent Document 3 discloses the technology regarding compensation of inter group interference. In order to compensate a voltage command value of each winding group, each noninterference control part is provided, compensation voltage amount is given to a two-way of each noninterference control part so as to perform noninterference compensation. However, according to the configuration in which among a plurality of control devices, by a vice control device which performs control when a command is received from a main control device, control of a second group is performed, it is determined such that calculation is performed by a main control device in advance of calculation which is performed by a vice control device, and even communication from a main control device to a vice control device can be performed, communication from a vice control device to a main control device cannot be performed. Accordingly, for example, even compensation from a first group to a second group can be performed, compensation from a second group to a first group cannot be performed. Consequently, noninterference compensation method which is disclosed by Patent Document 3 cannot be applied to the configuration in which control of a multiple-winding motor is performed by a main control device and a vice control device.

PRIOR ART REFERENCE

Patent Document

[Patent Document 1]
Japanese Patent Application Laid-Open No. 1993-260792
[Patent Document 2]
Japanese Patent Application Laid-Open No. 2004-32849
[Patent Document 3]
Japanese Patent Application Laid-Open No. 2003-153585

DISCLOSURE OF THE INVENTION

Problems to be Solved by the Invention

Regarding a control device in which a multiple-winding motor is driven by a plurality of power converters, there is a problem such that a control system becomes unstable due to inter group interference which is caused by inter winding magnetic coupling and it is difficult to realize high response so as to cause a current ripple. As a method for solving the above-mentioned problem, there is a control method in which control is performed by separating a mean value and a differential value of each winding of a multiple-winding motor which is disclosed by Patent Document 1, however, according to this method, the configuration of a current control system needs to be changed corresponding to a motor. Therefore, specification of a power converter needs to be changed for each motor, as a result, the number of steps becomes large, and consequently, development is ineffective.

Further, according to conventional control methods, when inter winding control is performed, a two-way communication is necessary. Regarding a two-way communication, there is a defect such that the number of part is increased and a synchronous calculation is complicated. Consequently, some control devices employ the configuration of a one-way communication. Regarding the above-mentioned one-way control device, there is a problem such that the above-mentioned prior art cannot be applied.

Considering the above-mentioned problem, this invention aims to provide a control device for a multiple-winding motor having the simple configuration in which even in a one-way communication, inter winding group interference can be suppressed and a control system can be stabilized.

Means for Solving the Problems

In a drive control apparatus for a multiple-winding motor having a plurality sets of winding groups, corresponding to each of the winding groups, the drive control apparatus comprising a power converter driving a winding group, a current detector detecting a current in the winding group, a controller controlling the power converter for driving the winding group based on a current deviation between a current value of the winding group which is detected by the current detector and a current command value of the winding group which is inputted, and the drive control apparatus further comprising a compensation amount calculator which obtains, by using a signal of a first controller controlling a first power converter driving a first winding group among the winding groups, a compensation amount for compensating a signal of other controller controlling other power converter other than the first power converter, wherein based on the compensation amount which is obtained by the compensation amount calculator, a signal of the other controller is compensated and the other power converter is controlled, and the first power converter is controlled without compensating a signal of the first controller.

Advantage of the Invention

According to this invention, an influence which is caused by dead time can be suppressed, even in a control configuration of a one-way communication, inter winding group interference can be suppressed and a control system can be stabilized, that is, there is an effect such that a drive control apparatus for a multiple-winding motor having the simple configuration can be obtained.

EMBODIMENTS FOR CARRYING OUT THE INVENTION

According to prior art, for example, between two sets of winding groups, control is performed so as to compensate interference in both of winding groups, or control is performed so as for current of both of winding groups to be coincident. That is, in two sets of winding group, a principal objective is to perform symmetry control. However, dead time in control system between a plurality of winding groups was not considered. Inventors of this invention clarified such that involving the dead time in control system in current control of a multiple-winding motor is one of causes to be unstable due to inter group interference, and realized the suppression of inter group interference by performing asymmetrical control.

Embodiment 1

Figure 1:
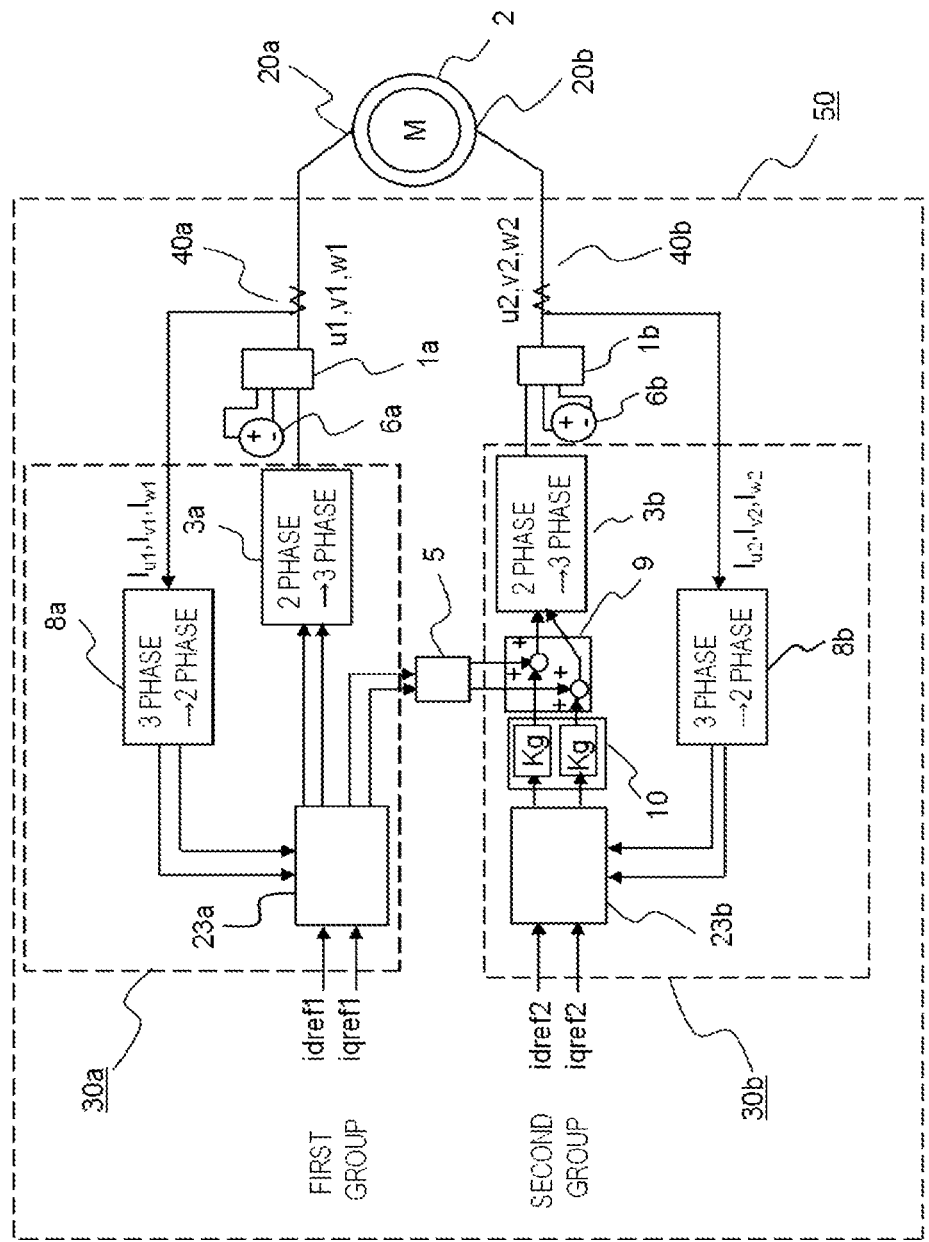
FIG. 1 is a block diagram for showing the configuration of a drive control apparatus for a multiple-winding motor according to Embodiment 1 of this invention.

FIG. 1 is a block diagram for showing the configuration of a drive control apparatus for a multiple-winding motor according to Embodiment 1 of this invention. In Embodiment 1, a case in which as a multiple-winding motor, a drive control of a two-windings motor having two sets of winding groups, that is, a first winding group 20a and a second winding group 20b is performed will be described as an example. A drive control apparatus 50 of a multiple-winding motor for performing driving control of a multiple-winding motor 2 comprises power converters 1a and 1b which convert power which is supplied from power sources 6a and 6b so as to supply to each winding group and performs current control with regard to power converters 1a and 1b so as for a current which flows in each winding group to conform to a current command value which is inputted. As a principle, controllers 30a and 30b which perform the control comprise three phase-two phase coordinate converting parts 8a and 8b which take in a three-phase current value of each winding group from current detectors 40*a* and 40*b* so as to convert to two phase on a rotary coordinate to input, current control parts 23*a* and 23*b* which calculate a voltage command value from a current command which is inputted with regard to each winding group and two phase-three phase coordinate converting parts 3*a* and 3*b* which convert a two-phase voltage command value to a three phase voltage command value, individually. Here, a control response, that is, a control gain of the current control part 23*a* is set to be equal to that of the current control part 23*b*.

The drive control apparatus 50 according to Embodiment 1 further comprises a compensation amount calculator 5 for calculating a compensation amount for compensating interference which is caused by magnetic coupling between winding groups, and the controller 30*b* for controlling the second winding group 20*b* comprises a compensation amount adding part 9 for adding the compensation amount to a voltage command value and a gain adjustment part 10. By the current control parts 23*a* and 23*b*, for example, by using PI control, a current value of each winding group can be followed to a current command value to be inputted with desired current control response. In this invention, a part for performing driving control of a first winding group may be referred to a part to which 'a first' is added. That is, a power converter 1*a* may be referred to as a first power converter 1*a*, and a controller 30*a* may be referred to as a first controller 30*a*. Further, a part for performing driving control of winding groups other than a first winding group may be referred to as a part to which 'other' is added. That is, a power converter 1*b* may be referred to as other power converter 1*b*, and a controller 30*b* may be referred to as other controller 30*b*, etc.

Figure 2:
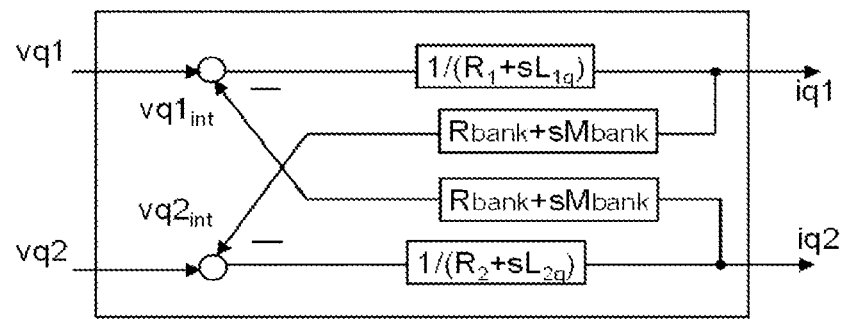
FIG. 2 is a q-axis block diagram for expressing a motor model of a two-windings motor for describing a principle of this invention.

In a multiple-winding motor, inter group interference becomes disturbance when current control is performed for each winding group, and there is the possibility such that inter group interference may adversely affect a control system, that is, a control system is made to be unstable. Therefore, in this invention, compensation is performed by a compensation amount calculator 5 so as to reduce an influence of disturbance which is caused by the interference, and stabilizing of a current control system is realized. In order to describe the principle, a q-axis block diagram of a motor model of two-windings motor will be shown in FIG. 2. In FIG. 2, a sign of vq1 indicates a first winding group q-axis voltage, a sign of vq2 indicates a second winding group q-axis voltage, a sign of $vq1_{int}$ indicates a q-axis voltage disturbance which is given by the second winding group to the first winding group by inter group interference, a sign of $vq2_{int}$ indicates q-axis voltage disturbance which is given by the first winding group to the second winding group by inter group interference, a sign of iq1 indicates a first winding group q-axis current, a sign of iq2 indicates a second winding group q-axis current, a sign of R1 and R2 indicate a winding resistance of a first winding group and that of a second winding group, individually, a sign of $L_{1q}$ and $L_{2q}$ indicate a conversion self-inductance of a first winding group and a second winding group of q-axis, individually, a sign of M bank indicates a conversion mutual inductance between winding groups, a sign of $R_{bank}$ indicates a resistance of inter conversion between groups, a sign of s indicates a differential operator of Laplace conversion. Here, conversion inductance is inductance which is expressed as a primary model comprising only simple resistance and reactor where input of a motor model is used as a armature current, output of a motor model is used as a armature voltage.

It can be seen from a motor shown in FIG. 2 such that voltages $vq1_{int}$ and $vq2_{int}$ are inputted in each winding group as disturbance each other due to interference of coupling between groups. Since the disturbance causes interference between groups, it is compensated so as to cancel the above-mentioned.

According to Embodiment 1, even in a control configuration in which only a one-way communication can be performed, regarding all winding groups, in order to perform non-interference, with regard to one way in which communication can be performed, in addition to compensating of a voltage command, by decreasing an influence of a feedback term which includes dead time of control, non-interference will be realize. The above-mentioned principle will be described based on a block diagram of FIG. 3 in which a model of a multiple-winding motor is expressed with input and output of only one group. Inter group interference part in a motor model shown in FIG. 3 includes dead time, Ti and Tv. Ti indicates dead time of current sampling and Tv indicates dead time from voltage command output to reflection, respectively. $vq2_{int}$ in FIG. 3 indicates voltage disturbance which is given by a first winding group to a second winding group in the same way as that of FIG. 2, and $iq2_{int}$ indicates current disturbance which is given by a disturbance voltage $vq2_{int}$.

Figures 4, 5:
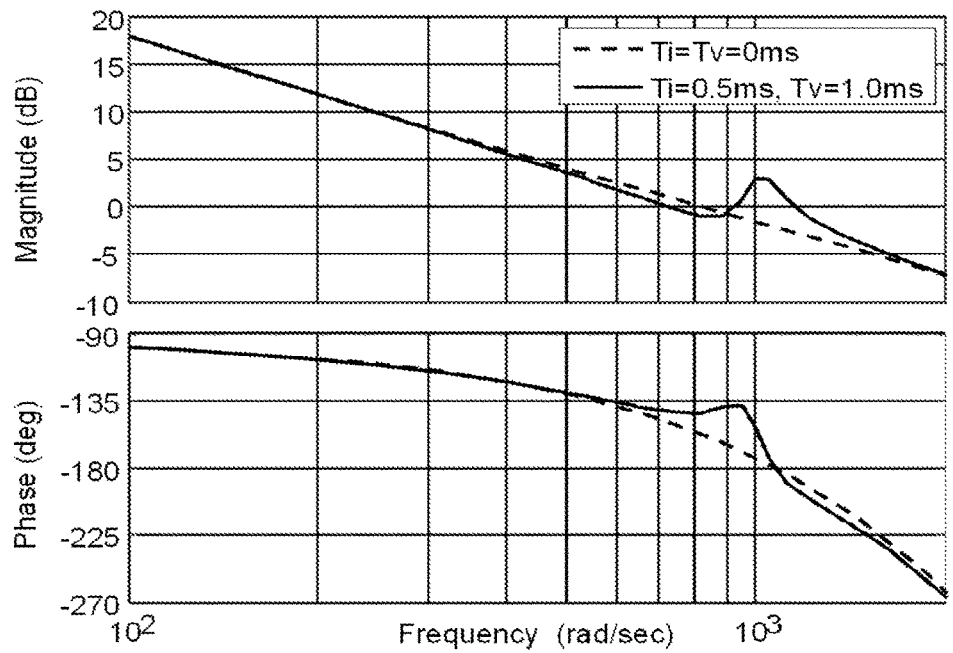
FIG. 4 is a Bode diagram in control of a two-windings motor for describing a principle of this invention.
FIG. 5 is a diagram showing a table of a motor constant which is used for drawing a Bode diagram of FIG. 4.

An un-stabilizing phenomenon which is caused by inter group interference does not occur in an ideal state in which there is no dead time, and an un-stabilizing phenomenon occurs only in a case where dead time is included in inter group interference term. A Board diagram showing the above is shown in FIG. 4. The board diagram is obtained in a case where a two-windings motor is controlled with the set of current control response 800 rad/s, when a current command vq1 is input and a current output of a motor model iq1 is output. In a case where a curve line of a solid line indicates dead time Ti=0.5 ms, Tv=1.0 ms, a broken line indicates a case where an ideal state where there is no dead time, a figure in an upper stage is a graph of a gain and a figure in a lower state is a graph of a phase. Motor constants which are used are shown in a table of FIG. 5. It can be seen from FIG. 4 such that in a case where there is no dead time, at frequency 800 rad/s, a gain comes close to zero value, and control can be performed by a current control response which is set, and a gain does not bulge, therefore, a control system is stable. On the other hand in a case where there is dead time, a gain bulges, even when a frequency is beyond 1000 rad/s, a gain is 0 dB or more, and a phase delay at a zero-crossing frequency of the gain is 180 degrees or more, that is, a control system is unstable. As above mentioned, it is found out such that including dead time in a control system makes a control system unstable.

Figure 3:
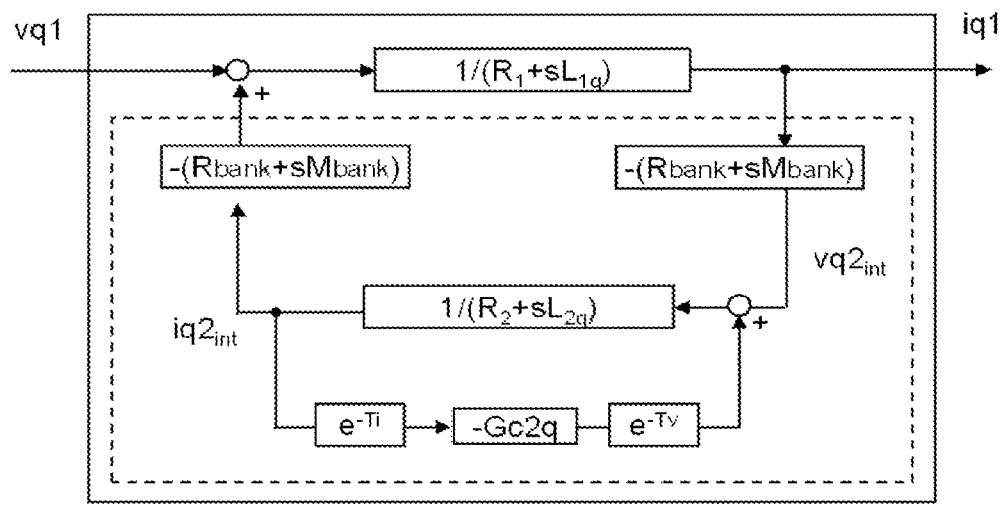
FIG. 3 is a block diagram for expressing a motor model of a two-windings motor with an input and an output of only one group for describing a principle of this invention.
Figure 6:
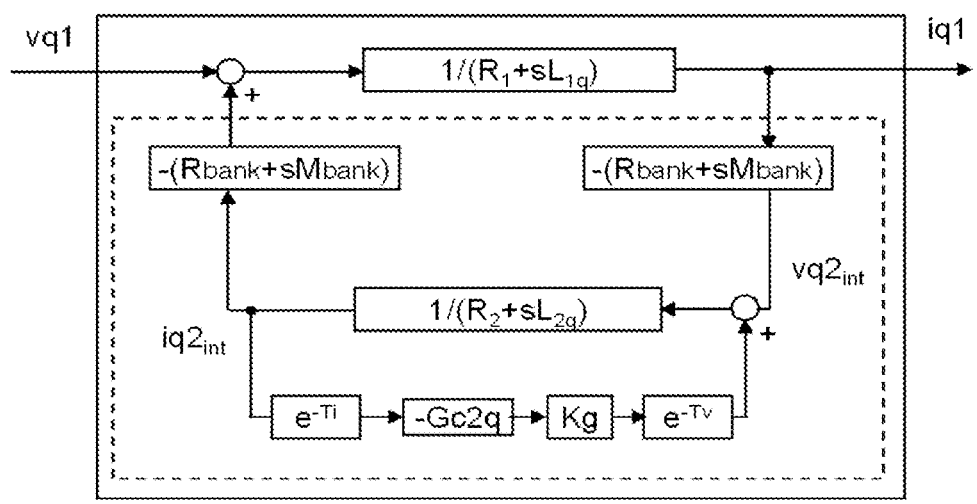
FIG. 6 is a block diagram which is made by adding a gain adjustment part to a block diagram of a motor model of FIG. 3 for describing a principle of this invention.

Consequently, according to this invention, by decreasing an influence of a feedback term which includes dead time, non-interference will be realized. In order to realize the above mentioned, adjusting a gain of a current control response is effective. Concretely, in Embodiment 1, a voltage command value which is outputted by a current control part 23*b* of a second winding group is corrected by a gain adjustment part 10 so as for a control gain to be small. A block diagram which is made by adding a gain adjustment part to a motor model in FIG. 3 is FIG. 6, and Kg in FIG. indicates an adjustment part. Providing the gain adjustment part 10 for correcting so as for a control gain to be small means such that setting a control gain of a second winding group to be smaller than a control gain of a first winding group. That is, here, the configuration in which a control response, that is, a control gain of a current control part 23*a* is set to be equal to that of a current control part 23b and a gain adjustment part 10 is provided in a controller 30b in a second winding group is described, however, it is needless to say such that without providing the gain adjustment part 10, a control gain of the current control part 23b in the second winding group may be set to be smaller than a control gain of the current control part 23b in the first winding group. It can be seen from FIG. 6 such that by setting a control gain of the second winding group to be smaller than a control gain of the first second winding group, an influence of amount which feedbacks including dead time $e^{-Ti}$ and $e^{-Tv}$ via a controller of the second winding group can be suppressed, consequently, non-interference can be realized.

As above mentioned, a voltage command value to which non-interference is performed is calculated, and a voltage command value of each winding group is determined. In a first winding group, by a two phase-three phase coordinate converting part 3a which converts two-phase voltage command value on a rotary coordinate which is outputted from a current control part 23a to three-phase, a three-phase voltage command value is calculated so as to output to a power converter 1a. In a second winding group, a compensation amount which is obtained by calculating in a compensation amount calculator 5 is added to two-phase voltage command value on a rotary coordinate which is outputted from a current control part 23a in a compensation amount addition part 9. By a two-phase-three phase converting part 3b which converts a two phase voltage command value on a rotary coordinate to which the compensation amount is added by the compensation amount addition part 9 so as to output, a three phase voltage command value is calculated so as to output to a power converter 1a. The power converters 1a and 1b convert a voltage of power sources 6a and 6b to a voltage corresponding to a voltage command value from two phase-three phase coordinate converting parts 3a and 3b so as to output to each winding group of a multiple-winding motor 2. Here, in the two phase-three phase coordinate converting parts 3a and 3b, and three phase-two phase coordinate converting parts 8a and 8b, in a case where there is a phase difference between winding groups, it is necessary to consider the phase difference even in a phase which is used in coordinate conversion and to pay attention to the necessity of adjusting between winding groups.

Figure 7:
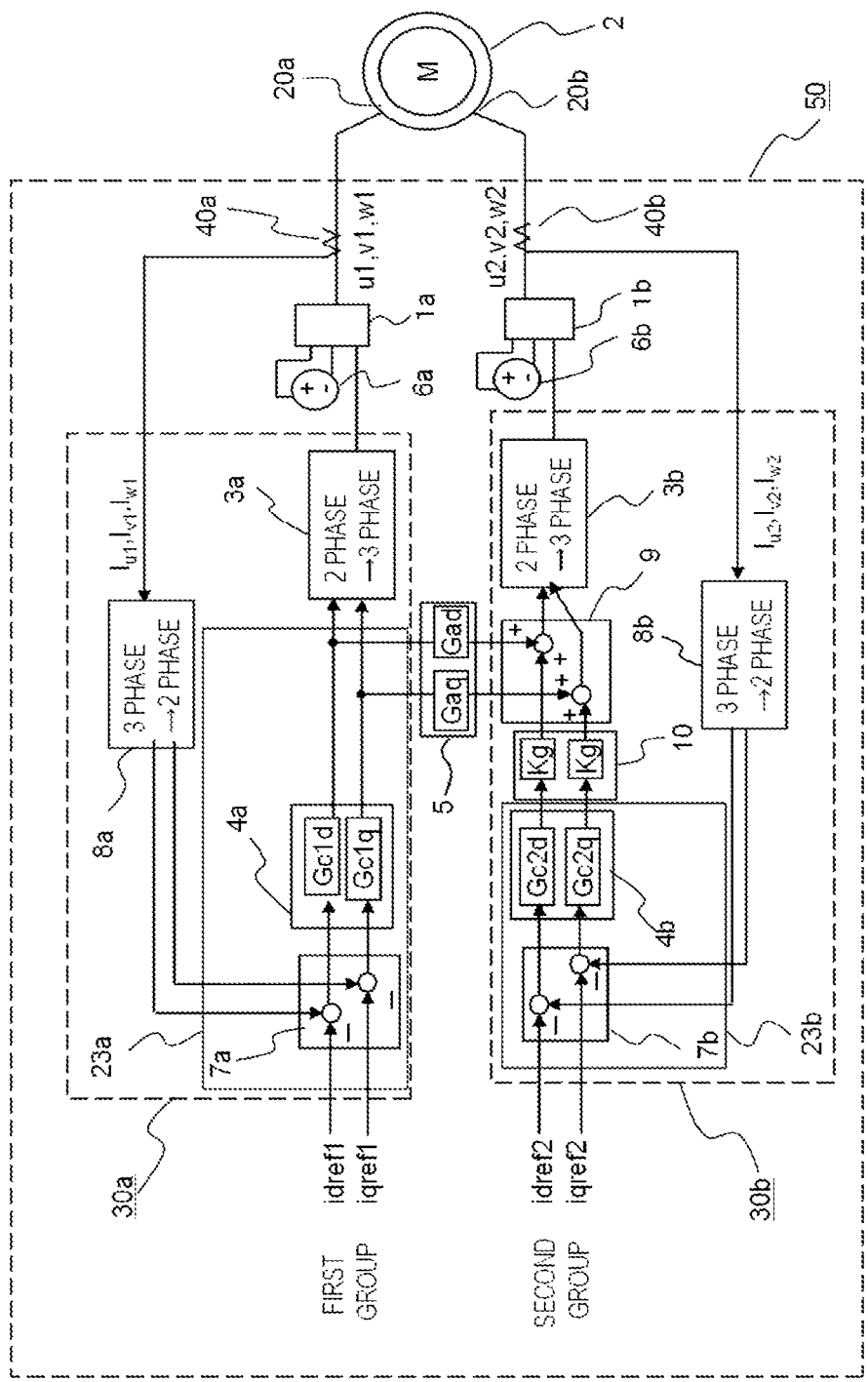
FIG. 7 is a more detailed block diagram showing the configuration of a drive control apparatus for a multiple-winding motor according to Embodiment 1 of this invention.

FIG. 7 is a block diagram showing one concrete example of the current control parts 23a and 23b, and the compensation amount calculator 5 in FIG. 1. The current control parts 23a and 23b comprise current deviation calculation parts 7a and 7b which calculate a deviation between a current command by feed-backing an output current which is inputted from a three phase-two phase coordinate converting part, and current control devices 4a and 4b which calculate a voltage command value based on calculation result of the current deviation calculation parts 7a and 7b. In Embodiment 1, a compensation amount with regard to a second winding group for suppressing inter group interference is obtained by calculating in the compensation amount calculator 5 using a voltage command value of a first winding group. In this calculation, for example, a gain in the compensation amount calculator 5 in d-axis and q-axis is indicated as $G_{ad}$ and $G_{aq}$, individually, and is set to be as follows.

$$G_{ad} = \frac{R_{bank} + sM_{bank}}{R_1 + sL_{1d}}, G_{aq} = \frac{R_{bank} + sM_{bank}}{R_1 + sL_{1q}}$$

Here, $L_{1d}$ is a first winding group conversion self-inductance in d-axis.

Principles of the above mentioned compensation will be described. As shown in FIG. 2, regarding inter group interference of a multiple-winding motor, a magnetic flux which is generated by other winding group is interlinked with regard to a current which flows in one winding group, and a voltage in a direction which prevents the change of a magnetic flux is generated in one winding group. A voltage which is induced by other winding groups becomes disturbance, therefore, a compensation voltage adds disturbance which is assumed to a voltage command with a reverse sign so as to cancel the disturbance and perform compensation. By doing the above mentioned, in a motor model in FIG. 2, inter group interference term can be canceled. Further, in a high frequency region which is sufficiently larger than a time constant of a motor, approximation can be made as follows, and by simpler calculation, non-interference can be realized.

$$G_{ad} = \frac{M_{bank}}{L_{1d}}, G_{aq} = \frac{M_{bank}}{L_{1q}}$$

In general, regarding motor drive, motor is driven at a basic frequency in a frequency region which is sufficiently high with regard to a frequency which is determined by a motor time constant, therefore, by using the above-mentioned simple calculation, sufficient non-interference effect can be obtained.

According to this invention, a first winding group is main control device, therefore, by using a first winding group, a voltage command value of a second winding group is compensated. As above mentioned, a first winding group is main control device, without performing the above mentioned compensation, regarding a voltage command value of a second winding group, by adjusting a control gain of a control device of a second winding group, non-interference can be realized. By doing the above mentioned, an influence of inter group interference with regard to a first winding group can also be suppressed. This is because such that adverse influence for control performance which is caused by inter group interference is an amount which includes dead time for returning to own group via other winding group, and in order to suppress the above mentioned, it is effective to set a current control gain of other winding groups to be small. For example, a current control gain is set to be following.

$$G_{c1d} = K_{pd1} + \frac{K_{id1}}{s}, G_{c1q} = K_{pq1} + \frac{K_{iq1}}{s} \qquad (1)$$

$$G_{c2d} = K_{pd2} + \frac{K_{id2}}{s}, G_{c2q} = K_{pq2} + \frac{K_{iq2}}{s}$$

At this time, a transfer function $G_{c2d}'$ and $G_{c2q}'$ from input of the current control device 4b to output of a gain adjustment part 10 will be expressed as follows.

$$G_{c2d}' = K_g\left(K_{pd2} + \frac{K_{id2}}{s}\right), G_{c2q}' = K_g\left(K_{pq2} + \frac{K_{iq2}}{s}\right) \qquad (2)$$

Here, Kg is an adjustment gain for suppressing adverse influence of dead time, for example, and is set as a constant of Kg<1.0. In equations (1) and (2), $K_{pd1}$, $K_{id1}$, $K_{pd2}$ and $K_{id2}$ are a proportional gain and an integral gain of a d-axis current control, individually, and $K_{pq1}$, $K_{iq1}$, $K_{pq2}$ and $K_{iq2}$ are a proportional gain and an integral gain of a q-axis current control, and will be set according to current control response.

Figure 8:
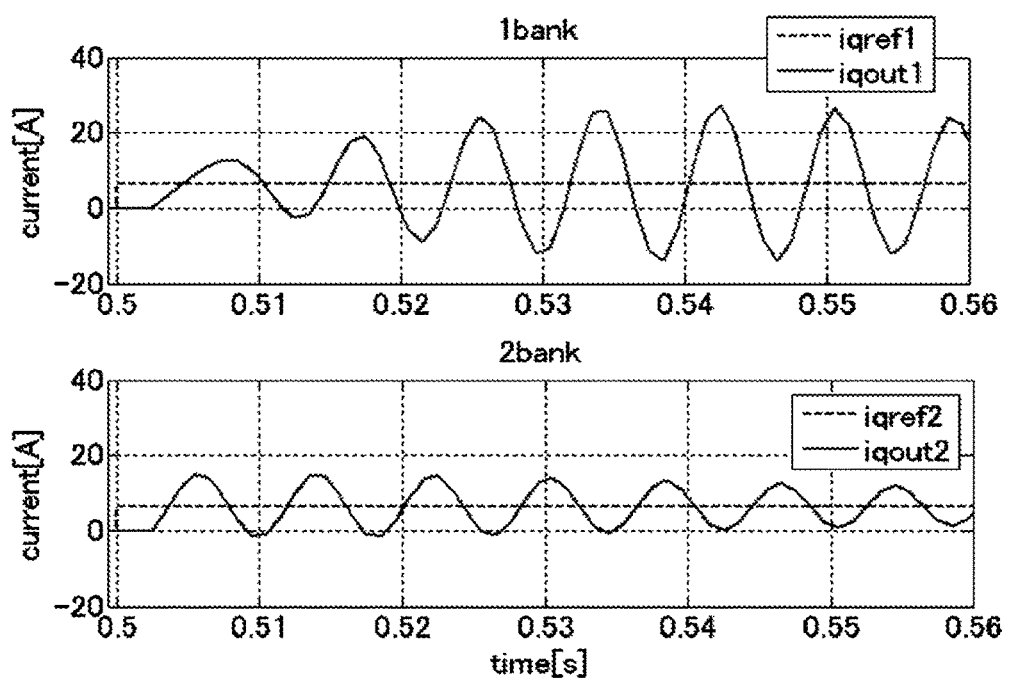
FIG. 8 is a first diagram showing the simulation result of a two-windings motor for describing an effect of a drive control apparatus for a multiple-winding motor according to Embodiment 1 of this invention.
Figure 9:
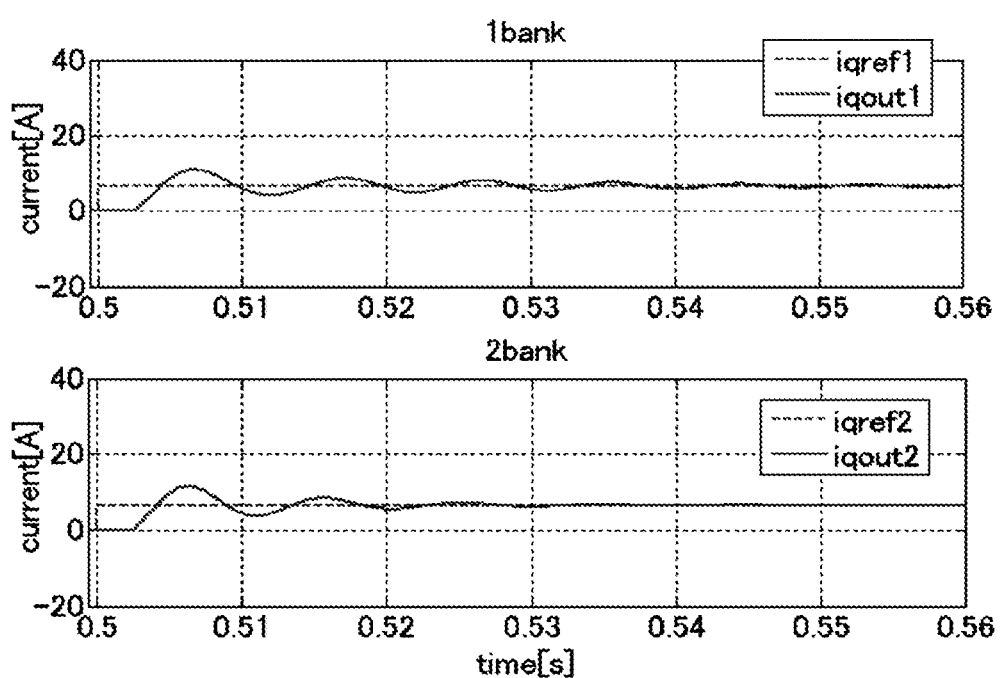
FIG. 9 is a second diagram showing the simulation result of a two-windings motor for describing an effect of a drive control apparatus for a multiple-winding motor according to Embodiment 1 of this invention.

In order to describe an effect of the gain adjustment part 10, in FIGS. 8 and 9, simulation result of a two-windings motor will be shown. For simplification, regarding a two-windings motor, it is set such that two winding groups are symmetrical, a constant of motor of a first winding group is equal to that of a second winding group, and a constant of a control axis d-axis is equal to that of a control axis q-axis. As a motor constant, a value which is described in a table of FIG. 5 is used. FIGS. 8 and 9 show a q-axis current output wave form which is simulated in a two-windings motor having a coupling ratio Mbank/L1=0.33, when a compensation gain is set to be Gad=Gaq=Mbank/L1=0.33 and a step signal is inputted into a q-axis current command of both winding groups. Regarding signs in a graph, iqref1 indicates a first winding group q-axis current command, iqout1 indicates a first winding group q-axis current output, iqref2 indicates a second winding group q-axis current command and iqout2 indicates a second winding group q-axis current output, individually.

FIG. 8 shows a case where a current control gain of a second winding group is equal to that of a first winding group, Kg=1, that is a case where a gain is not adjusted, and FIG. 9 shows a case where a current control gain of a second winding group is 0.7 times of that of a first winding group, that is, a current wave form when Kg=0.7. In a graph of FIG. 8 in which a gain of a second winding group is not adjusted, a current vibration becomes gradually large so as to be diverged. In a case of FIG. 9 in which a gain is adjusted, after a step command is inputted, it can be found out such that control is stably operated. Consequently, it can be confirmed such that by adjusting a gain of a single group, un-stabilization which is caused by inter group interference can be suppressed. As above mentioned, conventionally, by performing symmetry control as much as possible, inter group interference is intended to be suppressed, however, according to this invention, by performing non-interference control, an influence of dead time in a control system can be decreased, and it can be demonstrated such that inter group interference can be suppressed.

According to non-interference control method of Embodiment 1 of this invention, by using only a one-way communication, inter group non-interference control of multiplex winding motor can be realized, however, it is needless to say such that even in a control device in which a two-way communication can be performed, by using this non-interference method, non-interference can be performed.

Embodiment 2

Figure 10:
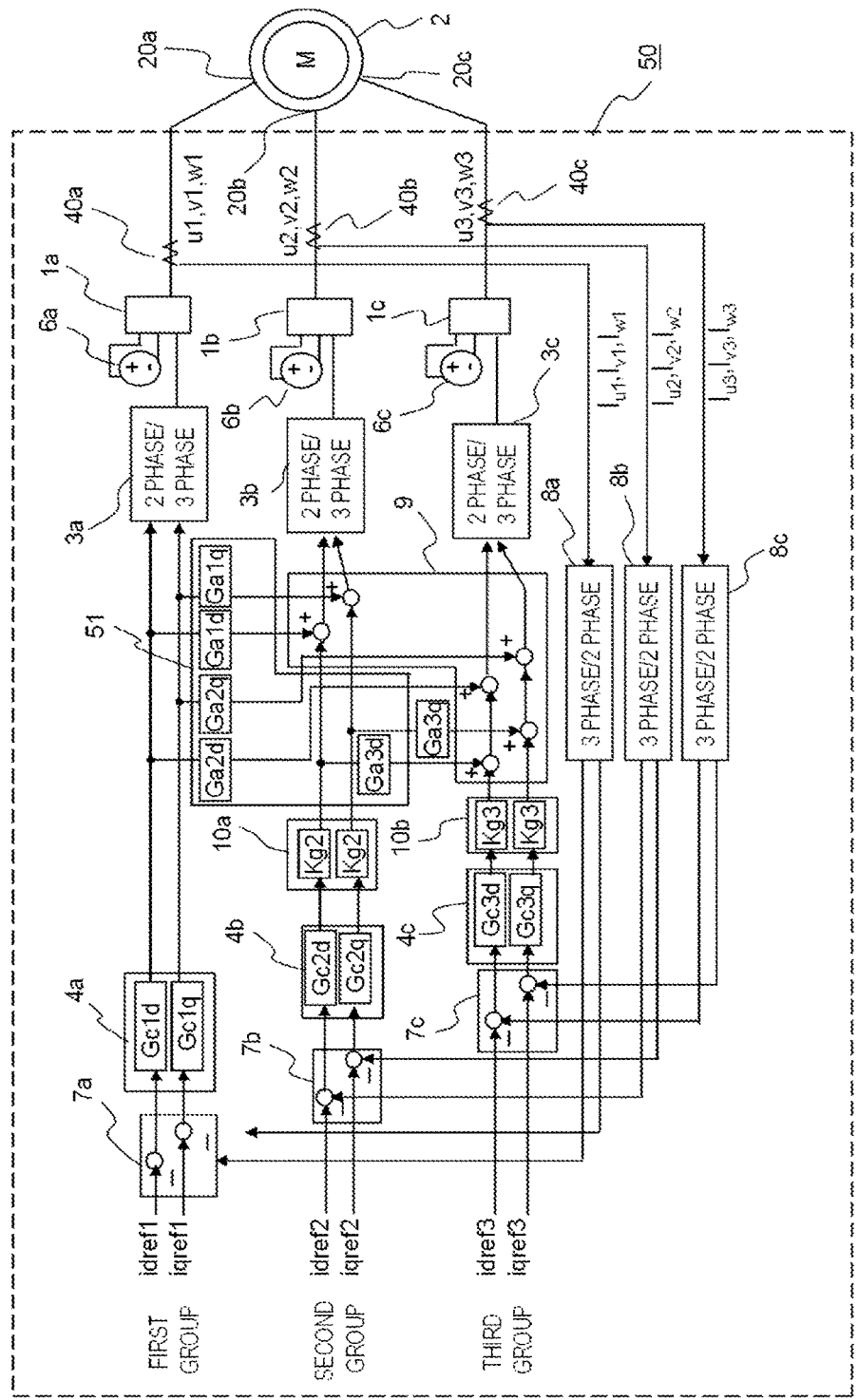
FIG. 10 is a block diagram for showing the configuration of a drive control apparatus for a multiple-winding motor according to Embodiment 2 of this invention.

FIG. 10 is a block diagram for showing the configuration of a drive control apparatus for a multiple-winding motor according to Embodiment 2 of this invention. In Embodiment 2, a case where a drive control for a three-windings motor having three sets of winding groups as a multiple-winding motor is performed will be described as an example. With regard to a current control of a third winding group, the configuration is same as the relationship of a second winding group with regard to a first winding group in Embodiment 1, and in Embodiment 2, a power converter 1c, a coordinate converting part 3c, a current control device 4c, a current deviation calculation part 7c, a coordinate converting part 8c and a gain adjustment part 10b are added to the configuration components in FIG. 7 showing the configuration of Embodiment 1. Further, regarding compensation amount calculation of inter group interference, as a compensation amount calculator 51, by using a voltage command of a second winding group, inter group interference compensation amount of a third winding group is calculated, and in a compensation amount addition part 9, the inter group interference compensation amount is added. In a third winding group, not only between a first winding group and a second winding group, but also between a first winding group and a third winding group, and between a second winding group and a third winding group, interwinding coupling is generated. A current and a voltage of each winding group are also affected by the above mentioned inter-winding coupling, therefore, by performing non-interference compensation for also between a second winding group and a third winding group, non-interference compensation with high accuracy can be performed. Consequently, in a compensation amount calculator 51, new compensation terms Ga2d, Ga2q, Ga3d and Ga3q are added. Here, compensation is not performed in a controller of a first winding group.

Also in Embodiment 2, in the same way as that of Embodiment 1, a current control gain and a compensation amount calculation equation can be set. Regarding a compensation amount calculation equation, in the same way as that of Embodiment 1, it may be set so as to cancel disturbance which is caused by inter group interference. Further, current control devices 4a, 4b and 4c are set corresponding to a current control response of each winding group. Regarding adjustment gain, for example, by setting an adjustment gain to be a constant such as $K_{g2}$<1.0, $K_{g3}$<1.0, an influence of an amount which includes dead time and returns to own group via a control device of other group can be reduced, therefore noninterference can be performed. Further, in a case where the number of winding group is 4 or more, by using a command value of other winding groups, inter group interference compensation amount can be calculated, therefore, without performing compensation in a controller of a first winding group, noninterference compensation can be performed. Consequently, also in a multiple winding motor comprising three sets or more of winding groups, an influence of disturbance which is caused by inter group interference can be decreased, as a result, stable driving can be performed. It is needless to say such that in Embodiments later than Embodiment 2, regarding a motor having three sets or more of winding groups, in the same way as that of Embodiment 2, noninterference corresponding to the number of winding groups can be performed.

Embodiment 3

Figure 11:
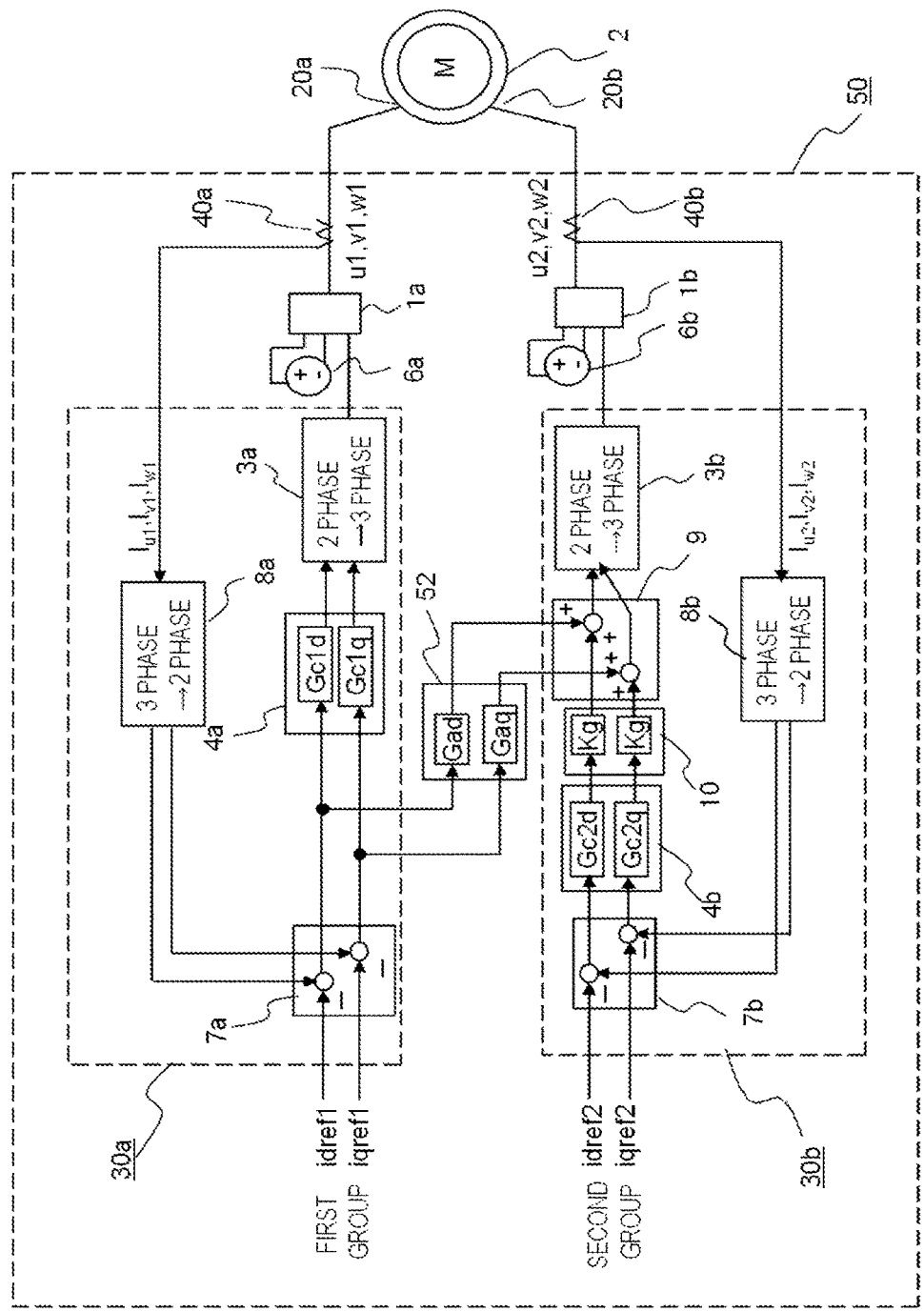
FIG. 11 is a block diagram for showing the configuration of a drive control apparatus for a multiple-winding motor according to Embodiment 3 of this invention.

FIG. 11 is a block diagram for showing the configuration of a drive control apparatus for a multiple-winding motor according to Embodiment 3 of this invention. The feature of Embodiment 3 is such that a compensation amount is obtained as a voltage amount from a current deviation. Other configuration components are same as those of Embodiment 1. A drive control apparatus for a multiple-winding motor 50 comprises a compensation amount calculator 52, and the compensation amount calculator 52 performs calculation of a compensation amount as a voltage amount by inputting a signal of a current deviation between a current command value of a winding group, where compensation is not performed, that is, in FIG. 11, a first winding group, and an output current of a motor. In Embodiments 1 and 2, information which is used for a compensation amount calculation so as to suppress inter group interference is a voltage. The feature of a current control device 4a is known, and by performing a compensation amount calculation based on the feature, a compensation amount calculation from a current value can be performed in the same way. Consequently, in Embodiment 3, a control device has the configuration such that calculation is performed from a current value. An adjustment gain 10 and other control calculations are same as those of Embodiments 1 and 2. As above mentioned, by performing a compensation amount calculation by using a signal of a current deviation, noninterference can be also realized. According to Embodiment 3, a compensation amount is not affected by a current control gain of a first winding group, therefore, even in a case where a current control response setting of each group is changed, there is a merit such that setting of compensation amount calculation is easy.

Embodiment 4

Figure 12:
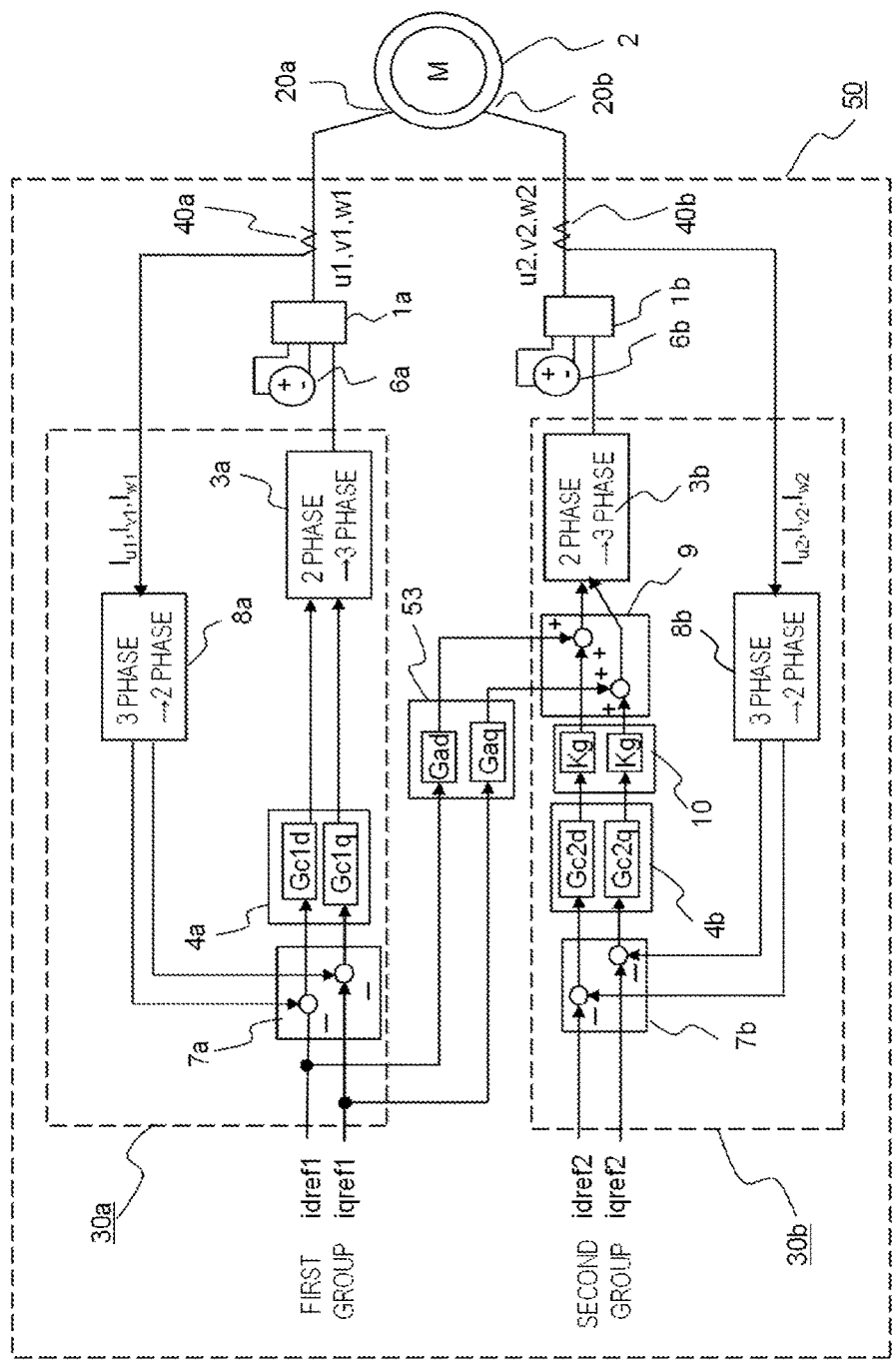
FIG. 12 is a block diagram for showing the configuration of a drive control apparatus for a multiple-winding motor according to Embodiment 4 of this invention.

FIG. 12 is a block diagram for showing the configuration of a drive control apparatus for a multiple-winding motor according to Embodiment 4 of this invention. The feature of Embodiment 4 is such that a compensation amount calculation is performed by using a signal of a current command value, and other configuration components are same as those of Embodiment 1. A drive control apparatus for a multiple-winding motor 50 comprises a compensation amount calculator 53 which performs a voltage compensation amount calculation from a current command value. Here, a command value does not include information of an output current, and inter group interference which is caused by a current which flows in real will not be considered. However, in a case where a signal of a current command value which is given by upper level control systems including speed control, position control, etc. is changed rapidly, by using a signal of a current command value for a compensation amount calculation, the influence which is caused by the changing amount as inter group interference can be suppressed. Regarding the calculation of a compensation amount calculator 53, a compensation amount calculation is performed so as to cancel interference between winding groups in the same as other Embodiments. In a case where command values are equal, by using a signal of a current command value of other winding groups, same effect can be obtained. As above mentioned, by using a signal of a current command value, non-interference of a multiple-winding motor can be realized and stable drive of a motor can be realized.

Embodiment 5

Figure 13:
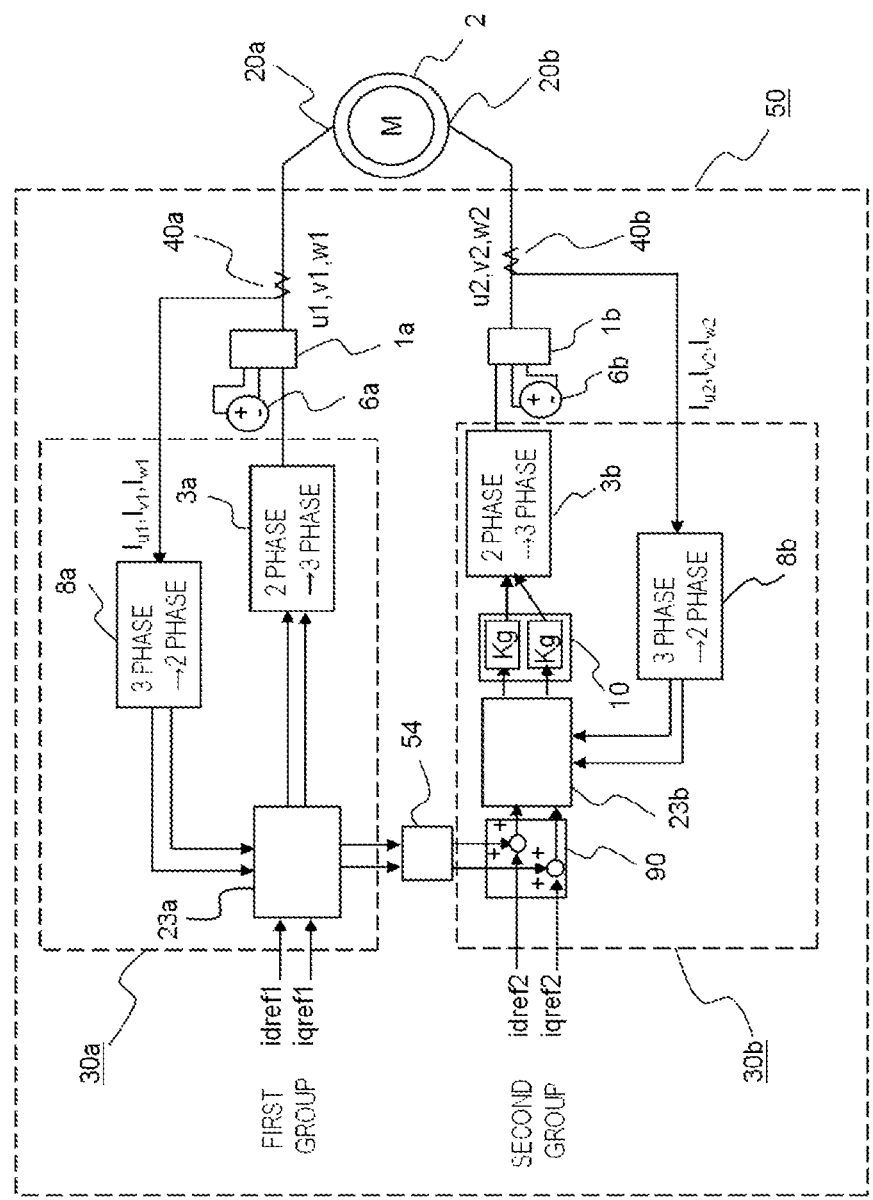
FIG. 13 is a block diagram for showing the configuration of a drive control apparatus for a multiple-winding motor according to Embodiment 5 of this invention.

FIG. 13 is a block diagram for showing the configuration of a drive control apparatus for a multiple-winding motor according to Embodiment 5 of this invention. According to the configuration of Embodiment 5, as a current amount, a compensation amount for inter group interference is obtained. Other than a part of a compensation amount calculation, the configuration is same as that of Embodiment 1. A signal for compensation amount calculation which is outputted by a current control part 23a is inputted to a compensation amount calculator 54. The compensation amount calculator 54 obtains a current compensation amount by a signal for compensation amount calculation which is inputted so as to output a current compensation amount, and the current compensation amount is added to a current command value by a compensation amount addition part 90 so as to perform compensation. In FIG. 13, regarding a first winding group, compensation is not performed, and regarding a second winding group, a compensation amount is calculated by a signal for compensation amount calculation which is received by a current control part 23a of a first winding group so as to perform non-interference compensation. As above mentioned, according to the feature of the Embodiment 5, only by a one way communication from a first winding group to a second winding group, non-interference can be realized. However, in the same way as that of Embodiment 1, this non-interference method can be applied to a control device having the configuration in which a two-way communication can be performed, therefore, it is not needless to say such that non-interference can be performed. Since even in a two way communication, non-interference method which is same as that of a case of a one-way communication can be used, it is not necessary to change control circuit due to a communication way, therefore, there is a merit such that system can be standardized.

Figure 14:
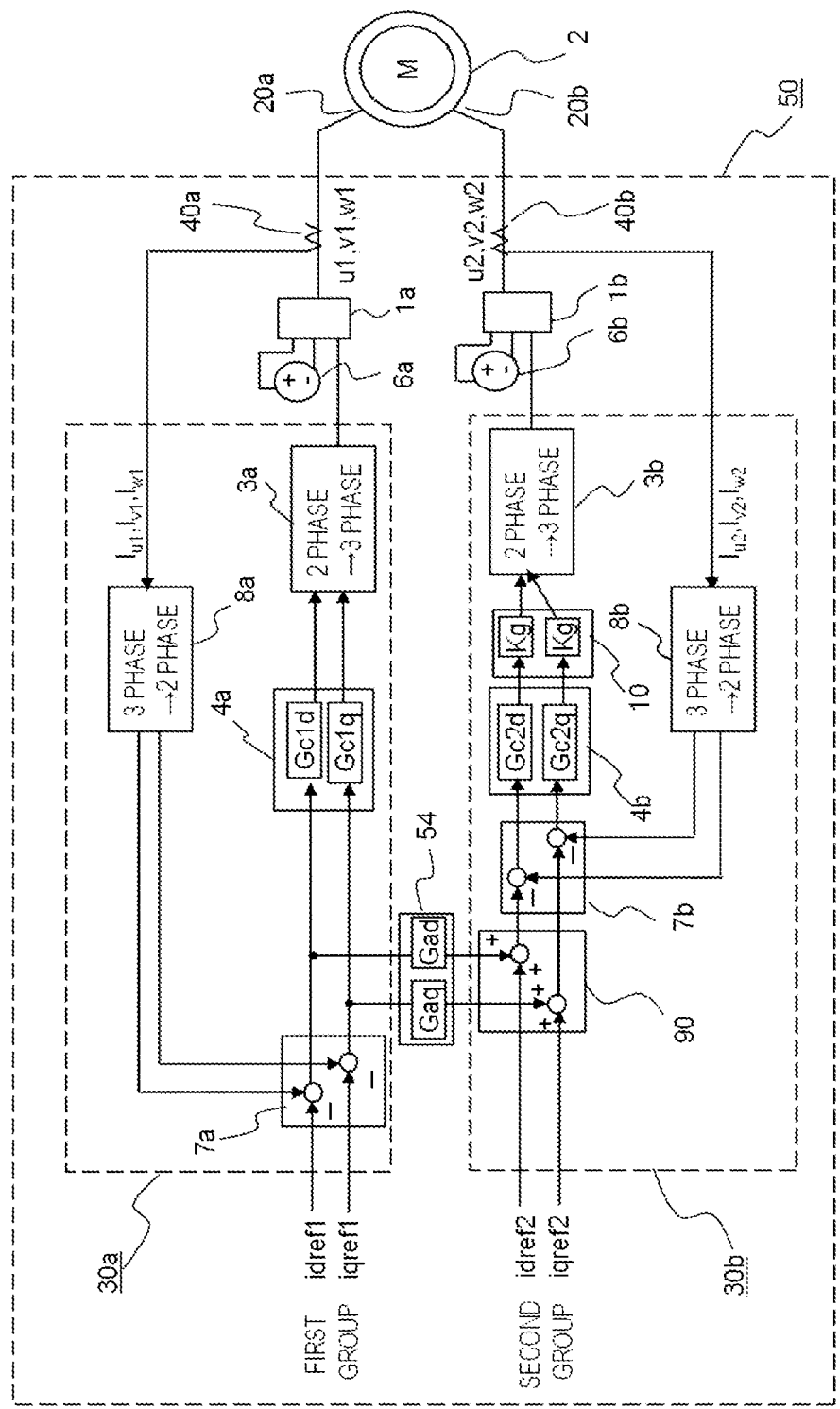
FIG. 14 is a more detailed block diagram showing an example of the configuration of a drive control apparatus for a multiple-winding motor according to Embodiment 5 of this invention.

FIG. 14 is a block diagram for describing an example of current compensation amount calculation in details. A drive control apparatus 50 has the configuration in which a compensation amount for performing inter group interference is obtained as a current value by the compensation amount calculator 54. The compensation amount which is calculated in the compensation amount calculator 54 by a signal of a current deviation, which is calculated by a current deviation calculation part 7a of a first winding group, between an output current of a first winding group and a current command value is added to a current command value of a second winding group in the compensation amount addition part 90, by a current deviation calculation part 7b, a deviation between an output current is calculated, and then is inputted to a current control device 4b. In the same way as that of Embodiment 1, a current control gain can be set by equation (1) and equation (2), and regarding a compensation amount calculator, in the same way, compensation amount calculation is performed so as to cancel inter group interference.

Figure 15:
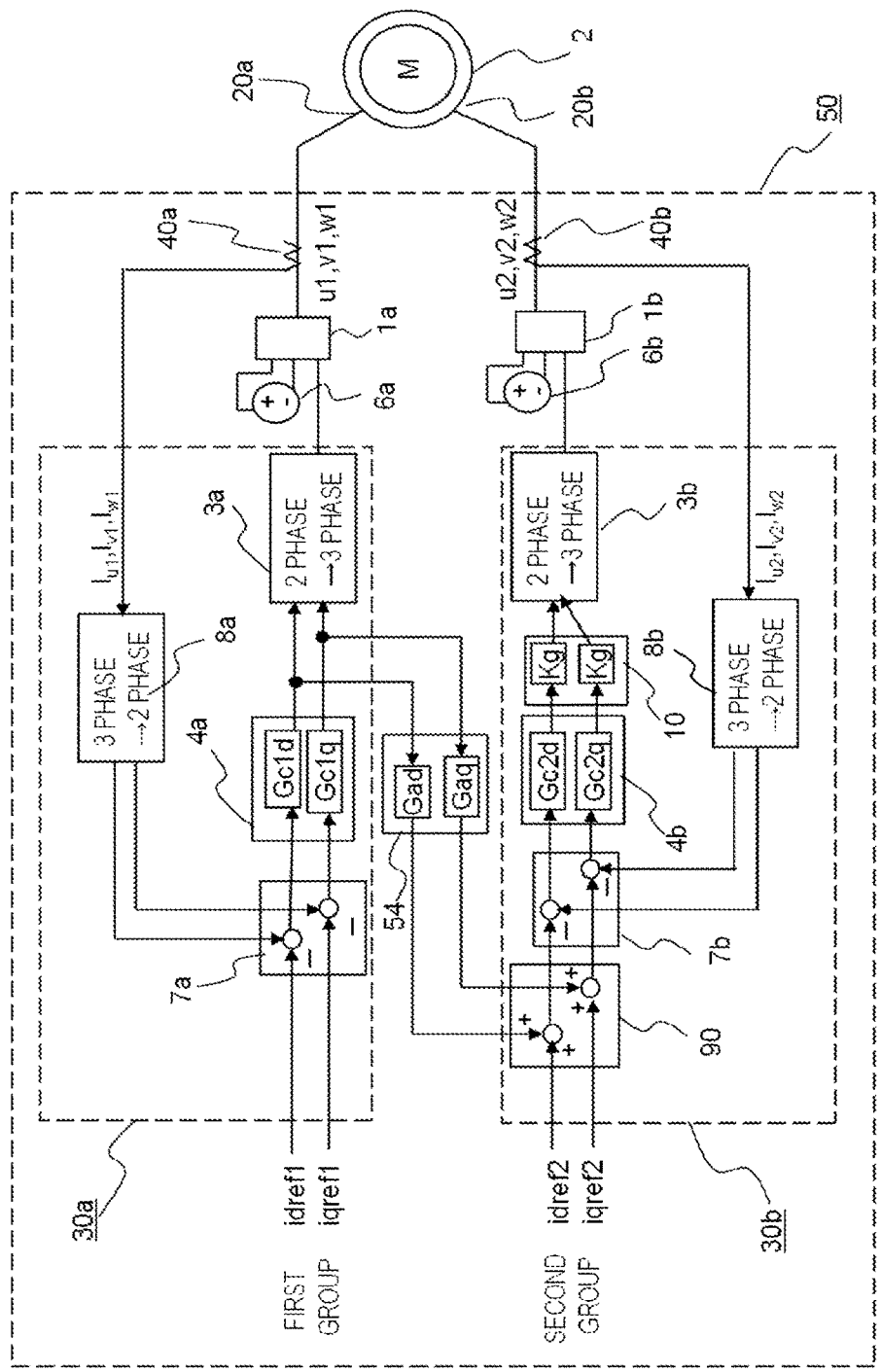
FIG. 15 is a more detailed block diagram showing another example of the configuration of a drive control apparatus for a multiple-winding motor according to Embodiment 5 of this invention.
Figure 16:
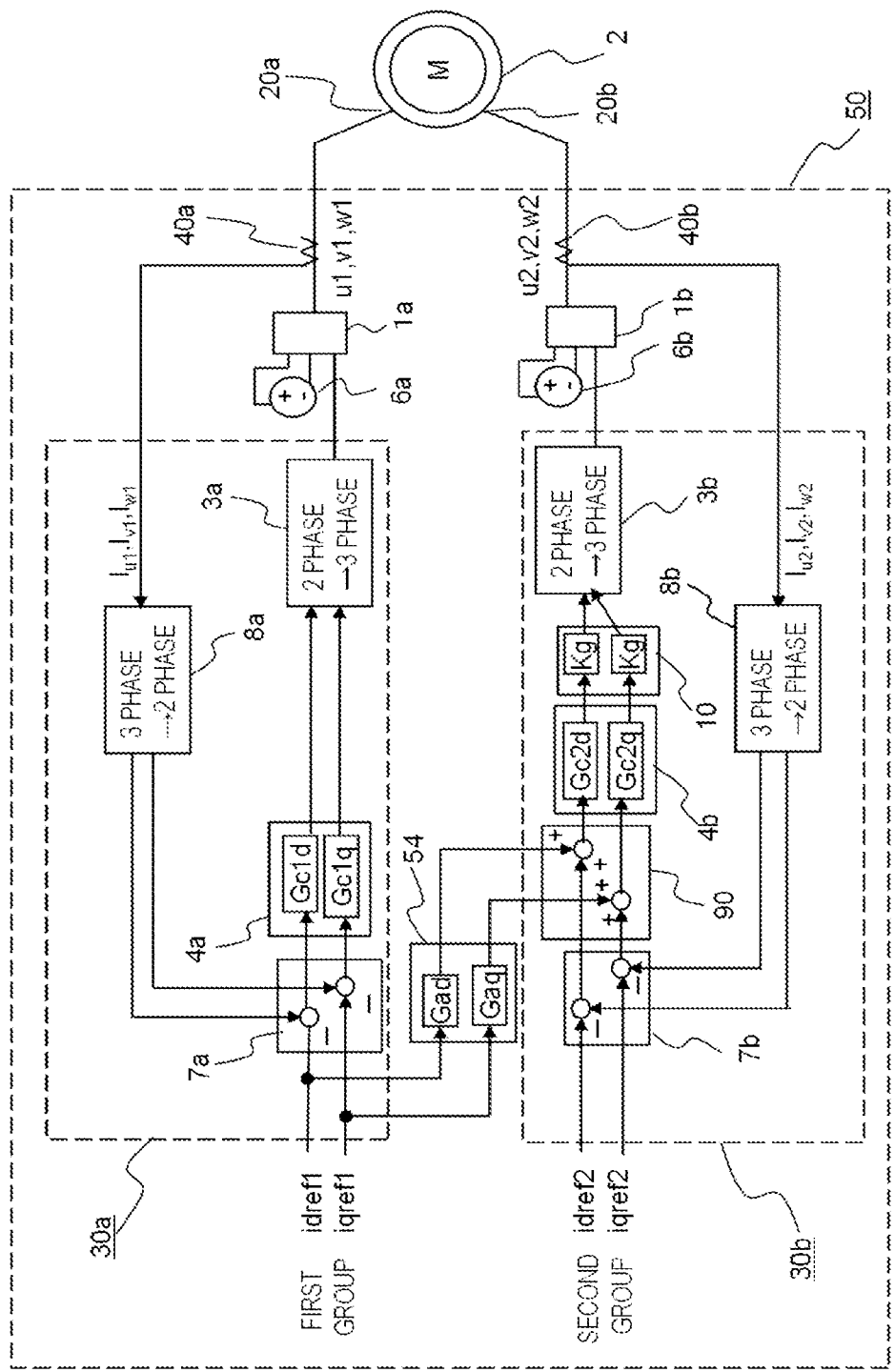
FIG. 16 is a more detailed block diagram showing another example of the configuration of a drive control apparatus for a multiple-winding motor according to Embodiment 5 of this invention.

In FIG. 15 and FIG. 16, examples in which current compensation amount calculation is different will be shown. As a signal for compensation amount calculation, in FIG. 15, a voltage command of a first winding group and in FIG. 16, a current command of a first winding group are used, individually. In FIG. 15, current compensation amount calculation is performed by using a signal of a voltage command value, and the feature of the current control device 4a is known, therefore, in the same way as that of Embodiment 1, by performing compensation amount calculation and gain adjustment, effect of non-interference can be obtained. In FIG. 16, compensation amount calculation is performed by using a signal of a current command value, in the same say as that of Embodiment 4, inter group interference which is caused by a current variation corresponding to rapid change of command value of upper system is compensated and non-interference can be realized. In a case where command values are equal, even by using a current command value of a second winding group, same effect can be obtained.

As above mentioned, by properly setting a compensation amount calculation and a current control gain, according to the configuration of Embodiment 5, non-interference effect which is same as that of a case in which compensation is performed by a voltage can be obtained, therefore, effect of stabilizing of a current control system and high-response can be obtained. With regard to a case in which the number of winding group is 3 or more, in the same way, by using this method, non-interference can be realized.

Embodiment 6

Figure 17:
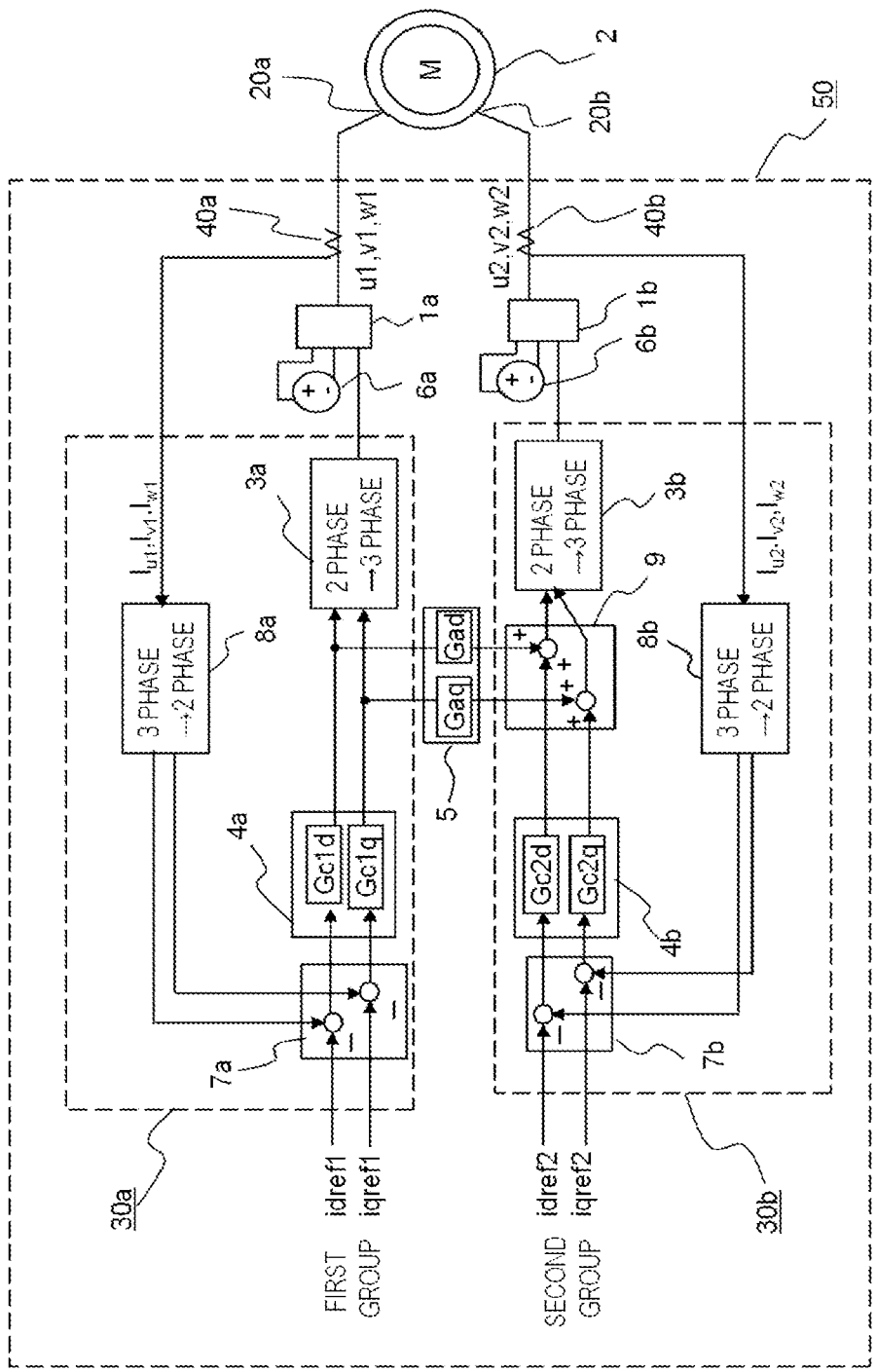
FIG. 17 is a block diagram for showing the configuration of a drive control apparatus for a multiple-winding motor according to Embodiment 6 of this invention.

FIG. 17 is a block diagram for showing the configuration of a drive control apparatus for a multiple-winding motor according to Embodiment 6 of this invention. In Embodiments 1 to 5, a gain adjustment part for adjusting a control gain of a controller of a winding group for performing compensation is provided and it is set such that a control gain of a controller of a second winding group 30b is smaller than a control gain of a first winding group 30a. In Embodiment 6, only a compensation amount calculator 5 which calculates a compensation amount for compensating a voltage command value of a controller of a second winding group 30b by using a signal of a controller of a first winding group 30a is provided and a gain adjustment part is not provided in the controller of a second winding group 30b. That is, it is set such that a control gain of the controller of a first winding group 30a is equal to a control gain of the controller of a second winding group 30b.

As above mentioned, without performing gain adjustment, only by compensating a signal of the controller of a second winding group 30b by the compensation amount which is obtained by calculating, non-interference can be performed. For example, even when a current response of a current control part 23a of the controller of a first winding group 30a and that of a current control part 23b of the controller of a second winding group 30b, that are control gains are small, in a system where a current deviation can be made small, that is, a current value of each winding group can be made close to a current command value, even by setting a control gain of the controller of a second winding group 30b to be equal to a control gain of the controller of a first winding group 30a, non-interference can be performed.

Figure 18:
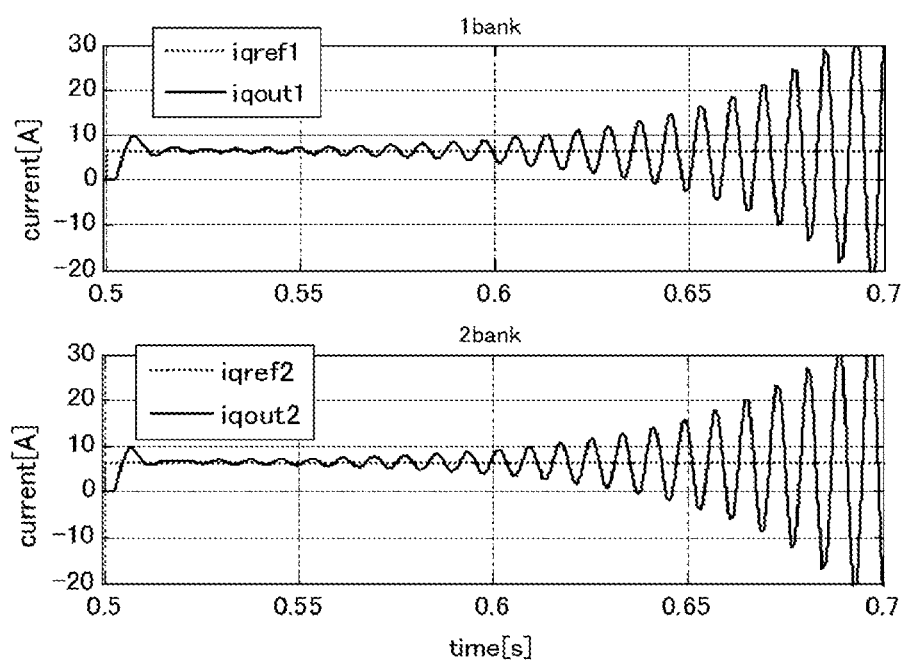
FIG. 18 is a first diagram showing the simulation result of a two-windings motor for describing an effect of a drive control apparatus for a multiple-winding motor according to Embodiment 6 of this invention.
Figure 19:
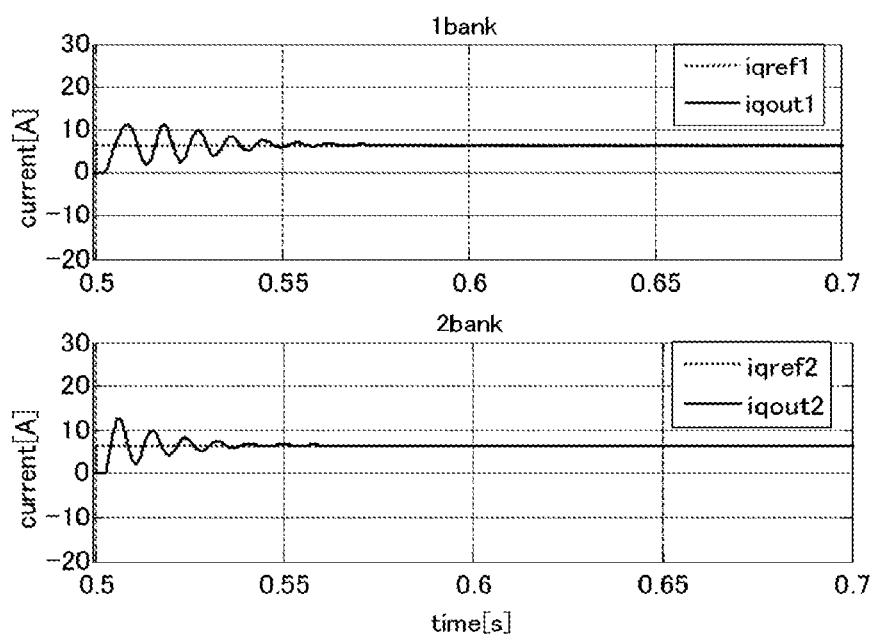
FIG. 19 is a second diagram showing the simulation result of a two-windings motor for describing an effect of a drive control apparatus for a multiple-winding motor according to Embodiment 6 of this invention.

In FIG. 18 and FIG. 19, a result of simulation of a two-windings motor in a case where a gain adjustment part is not provided will be shown. A solid line in FIG. 18 shows a first winding group q-axis current output iqout 1 and a second winding group q-axis current output iqout 2 in a case where a control signal of a second winding group is not compensated. In FIG. 19, in a system which is same as that in FIG. 18, a first winding group q-axis current output iqout 1 and a second winding group q-axis current output iqout 2 in a case where a compensation amount calculator 5 and a compensation amount addition part 9 in FIG. 17 are provided so as to compensate a control signal of a second winding group is shown. As above mentioned, we can see such that there are some conditions for achieving non-interference by not providing a gain adjustment part in the controller of a second winding group 30b, only by setting a control gain of the controller of a first winding group 30a to be equal to a control gain of the controller of a second winding group 30b, and adding a compensation amount which is calculated by the compensation amount calculator 5.

Here, the configuration in which a gain adjustment part is not provided in the configuration which corresponds to the configuration of FIG. 7 in Embodiment 1 is described, however, it is not needless to say such that there are some conditions for achieving non-interference in the same way even in the configuration in which a gain adjustment is not provided in the configuration of other Embodiments.

As above mentioned, according to this invention, by using either of a signal of a first controller for controlling a first power converter for driving a first winding group, a compensation amount for compensating either of a signal of other controller for controlling a power converter other than the first power converter is obtained so as to compensate either of a signal, by controlling other power converter, not by compensating a signal of the first controller but by controlling the first power converter, an influence of dead time of control system is reduced and a control device for a multiple-winding motor which can suppress inter group interference can be realized.

It is understood that the present disclosure of the preferred form has been changed in the details of construction and the combination and arrangement of parts may be restored to without departing from the spirit and the scope of the invention as hereinafter claimed.

REFERENCE CHARACTERS

1a: power converter (first power converter)
1b, 1c: power convert (other power converter)
2: multiplex winding motor
30a: controller (first controller)
30b: controller (other controller)
40a, 40b, 40c: current detector
5, 51, 52, 53, 54: compensation amount calculator

The invention claimed is:
1. A drive control apparatus for a multiple-winding motor having a plurality sets of winding groups,
corresponding to each of the winding groups, the drive control apparatus comprising
a power converter driving a winding group,
a current detector detecting a current in the winding group and
a controller controlling the power converter for driving the winding group by obtaining a voltage command value for controlling the power converter based on a current deviation between a current value of the winding group which is detected by the current detector and a current command value of the winding group which is inputted, and
the drive control apparatus further comprising a compensation amount calculator which obtains, by using a signal of a first controller controlling a first power converter driving a first winding group among the winding groups, a compensation amount for compensating a signal of other controller controlling other power converter other than the first power converter,
wherein based on the compensation amount which is obtained by the compensation amount calculator, a signal of the other controller is compensated and the other power converter is controlled, and the first power converter is controlled without compensating a signal of the first controller, and
wherein regarding a control system from the current command value of the first winding group to a current of the first winding group, in a case where a control gain of the other controller is set to the same as a value of a control gain which is set as a control gain of the first controller, a phase delay of the control system at a zero crossing frequency of the gain is 180 degrees or more, a control gain of other controller is set to be equal to or smaller than a control gain which is set as a control gain of the first controller and, by using a signal of the first controller, the compensation amount calculator obtains the compensation amount for compensating a signal of the voltage command value of the other controller or a signal of the current command value of the other controller.

2. The drive control apparatus for a multiple-winding motor according to claim 1,
wherein the compensation amount calculator uses a signal of the voltage command value of the first controller so as to obtain the compensation amount for compensating a signal of a command value of the other controller.

3. The drive control apparatus for a multiple-winding motor according to claim 2,
wherein a control gain of the other controller is equal to or smaller than a control gain of the first controller.

4. The drive control apparatus for a multiple-winding motor according to claim 3,
wherein regarding a control system from the current command value of the first winding group to a current of the first winding group, in a case where a control gain of the other controller is set to the same as a value of a control gain which is set as a control gain of the first controller, a phase delay of the control system at a zero crossing frequency of the gain is 180 degrees or more.

5. The drive control apparatus for a multiple-winding motor according to claim 2,
wherein regarding a control system from the current command value of the first winding group to a current of the first winding group, in a case where a control gain of the other controller is set to the same as a value of a control gain which is set as a control gain of the first controller, a phase delay of the control system at a zero crossing frequency of the gain is 180 degrees or more.

6. The drive control apparatus for a multiple-winding motor according to claim 1,
wherein a control gain of the other controller is equal to or smaller than a control gain of the first controller.

7. The drive control apparatus for a multiple-winding motor according to claim 6,
wherein regarding a control system from the current command value of the first winding group to a current of the first winding group, in a case where a control gain of the other controller is set to the same as a value of a control gain which is set as a control gain of the first controller, a phase delay of the control system at a zero crossing frequency of the gain is 180 degrees or more.

8. The drive control apparatus for a multiple-winding motor according to claim 1,
wherein regarding a control system from the current command value of the first winding group to a current of the first winding group, in a case where a control gain of the other controller is set to the same as a value of a control gain which is set as a control gain of the first controller, a phase delay of the control system at a zero crossing frequency of the gain is 180 degrees or more.

9. A drive control apparatus for a multiple-winding motor having a plurality sets of winding groups,
corresponding to each of the winding groups, the drive control apparatus comprising
a power converter driving a winding group
a current detector detecting a current in the winding group and
a controller controlling the power converter for driving the winding group by obtaining a voltage command value for controlling the power converter based on a current deviation between a current value of the winding group which is detected by the current detector and a current command value of the winding group which is inputted and
the drive control apparatus further comprising a compensation amount calculator which obtains, by using a signal of a first controller controlling a first power converter driving a first winding group among the winding groups, a compensation amount for compensating a signal of other controller driving other power converter other than the first power converter,
wherein based on the compensation amount which is obtained by the compensation amount calculator, a signal of the other controller is compensated and the other power converter is controlled, and the first power converter is controlled without compensating a signal of the first controller, and
wherein the compensation amount calculator uses a signal of the current deviation of the first controller so as to obtain the compensation amount for compensating a signal of the voltage command value of the other controller or a signal of the current command value of the other controller.

10. A drive control apparatus for a multiple-winding motor having a plurality sets of winding groups,
corresponding to each of the winding groups, the drive control apparatus comprising
a power converter driving a winding group
a current detector detecting a current in the winding group and
a controller controlling the power converter for driving the winding group by obtaining a voltage command value for controlling the power converter based on a current deviation between a current value of the winding group which is detected by the current detector and a current command value of the winding group which is inputted and
the drive control apparatus further comprising a compensation amount calculator which obtains, by using a signal of a first controller controlling a first power converter driving a first winding group among the winding groups, a compensation amount for compensating a signal of other controller driving other power converter other than the first power converter,
wherein based on the compensation amount which is obtained by the compensation amount calculator, a signal of the other controller is compensated and the other power converter is controlled, and the first power converter is controlled without compensating a signal of the first controller, and
wherein the compensation amount calculator uses a signal of the current command value of the first controller so as to obtain the compensation amount for compensating a signal of the voltage command value of the other controller or a signal of the current deviation of the other controller.

* * * * *